May 23, 1944.　　　G. C. GARRAWAY　　　2,349,260
PHOTOGRAPHIC PROJECTOR
Filed Jan. 1, 1943　　　6 Sheets-Sheet 3

INVENTOR
GEORGE C. GARRAWAY
BY Francis J. Vanderwerken and Joseph H. Grove
ATTORNEYS May 23, 1944. G. C. GARRAWAY 2,349,260
PHOTOGRAPHIC PROJECTOR
Filed Jan. 1, 1943 6 Sheets-Sheet 5

INVENTOR
GEORGE C. GARRAWAY
ATTORNEYS

May 23, 1944.   G. C. GARRAWAY   2,349,260
PHOTOGRAPHIC PROJECTOR
Filed Jan. 1, 1943   6 Sheets-Sheet 6

Inventor
GEORGE C. GARRAWAY
By
Attorneys

Patented May 23, 1944

2,349,260

UNITED STATES PATENT OFFICE 2,349,260

PHOTOGRAPHIC PROJECTOR

George C. Garraway, Rutherford, N. J.

Application January 1, 1943, Serial No. 471,055

6 Claims. (Cl. 88—24)

(Granted under the act of March 3, 1883, as amended April 30, 1928; 370 O. G. 757)

The invention described herein may be manufactured and used by or for the Government for governmental purposes, without payment to me of any royalty thereon.

This invention relates to a photographic projector enlarger, and more particularly it is directed to a device of this character adapted to project an enlarged image of a negative or film onto a sensitized surface of any suitable material for printing purposes.

One of the objects of the invention is to provide a relatively movable photographic projector adapted to project an enlarged image of a negative or film onto a sensitized surface and embodying means for positioning the projector relative to the surface for producing a predetermined enlargement of the negative image on the surface.

Another object of the invention is to provide a photographic projector including an adjustable enlarging camera having a lens thereon movable relatively to a negative or film and a sensitized surface, and means for automatically actuating the enlarging camera for adjusting the camera lens into proper relation with the negative or film and sensitized surface whereby the enlarging camera is automatically focused to produce any desired ratio of enlargement of an image of the negative or film on the sensitized surface.

Another object of the invention is to provide a photographic projector embodying a relatively movable lamp housing assembly carried by a negative holder and including condensing lenses, an adjustably mounted light source, and means for adjusting the light source in relation to the center and focal point of the condensing lenses, whereby various portions of a negative on the holder may be under or over exposed to light rays from the light source.

Another object of the invention is to provide a horizontally movable photographic projector embodying a vertically actuated extensible bellows on an enlarging camera, means for reflecting an image of a negative, at a right angle to the extensible bellows, onto a sensitized surface, and means for automatically actuating the extensible bellows in a vertical direction upon the horizontal movement of the projector, whereby the focus of the camera is automatically corrected for any horizontal positioning of the projector relative to the sensitized surface.

Another object of the invention is to provide a photographic projector adapted to project an image of a negative or film onto a sensitized surface, and embodying a relatively movable lamp housing assembly including a light source and a negative or film holder on which a negative or film may be held in a fixed position, said negative or film holder adapted to be rotated for rotating the negative or film in a limited arc about an axis paralleling rays from the light source in order to change the angular position of the projected negative or film image on the sensitized surface, without necessitating the removal of the negative or film holder from the projector.

With the above and other objects and advantages in view, the invention consists of certain features of construction and operation of parts which will hereinafter be described and shown in the accompanying drawings, in which:

Referring more specifically to the drawings, 1 designates a vertically extending lamp housing mounted centrally on the upper surface of a horizontally extending negative carrier indicated generally by A, which negative carrier A is fixedly mounted on a pair of longitudinally extending short tubular members 2 and 2' by means of longitudinally extending collars 3 mounted on diametrically opposite lower side edges of the ring base 4 of the negative carrier. The short tubular members 2 and 2' are in turn slidably mounted upon a pair of spaced parallel longitudinally extending tubular supporting members 5 and 5', the ends of which are fixedly mounted in horizontally extending collars 6 having depending downwardly therefrom transversely extending portions 7 in which the ends of transversely extending end members 8 and 8' are mounted, said end members 8 and 8' being in turn mounted on a substantially rectangular fixed frame 9 by means of supporting brackets 10 having end plates 11 mounted thereon supporting a pair of spaced parallel and longitudinally extending supporting bars 12 and 12' directly below the pair of supporting members 5 and 5', respectively.

Figure 1:
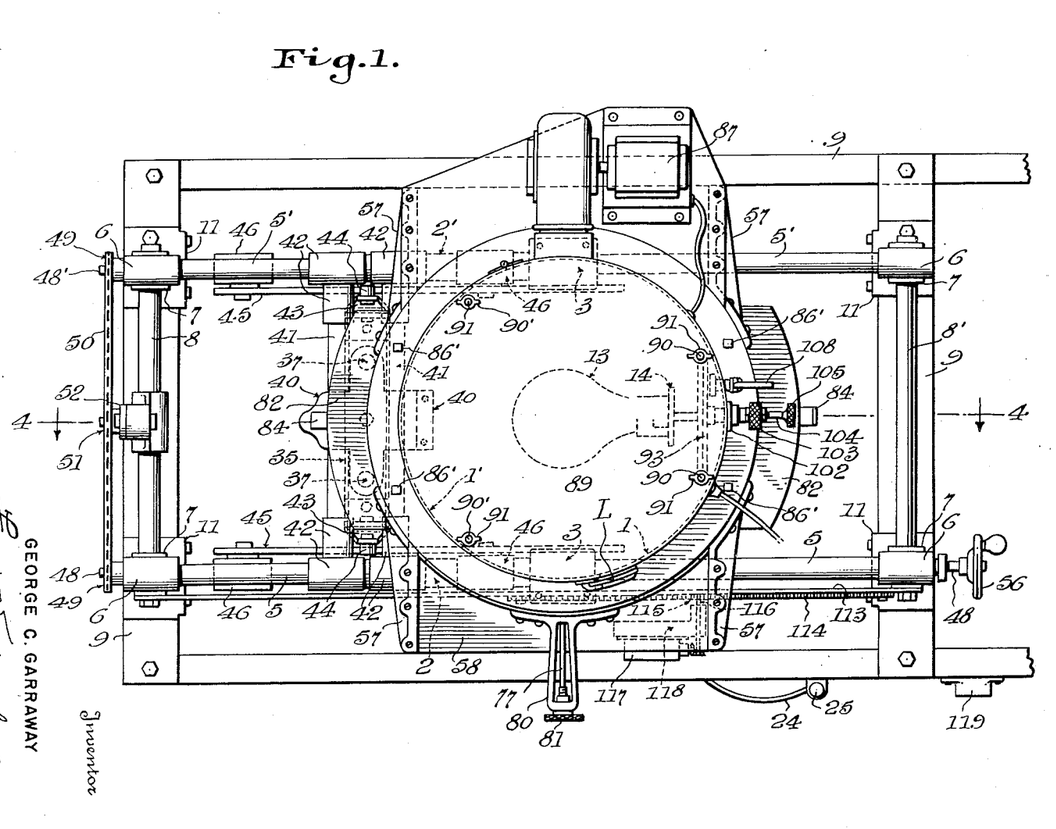
Fig. 1 is a top plan view of the improved photographic projection enlarger.
Figures 2, 6:
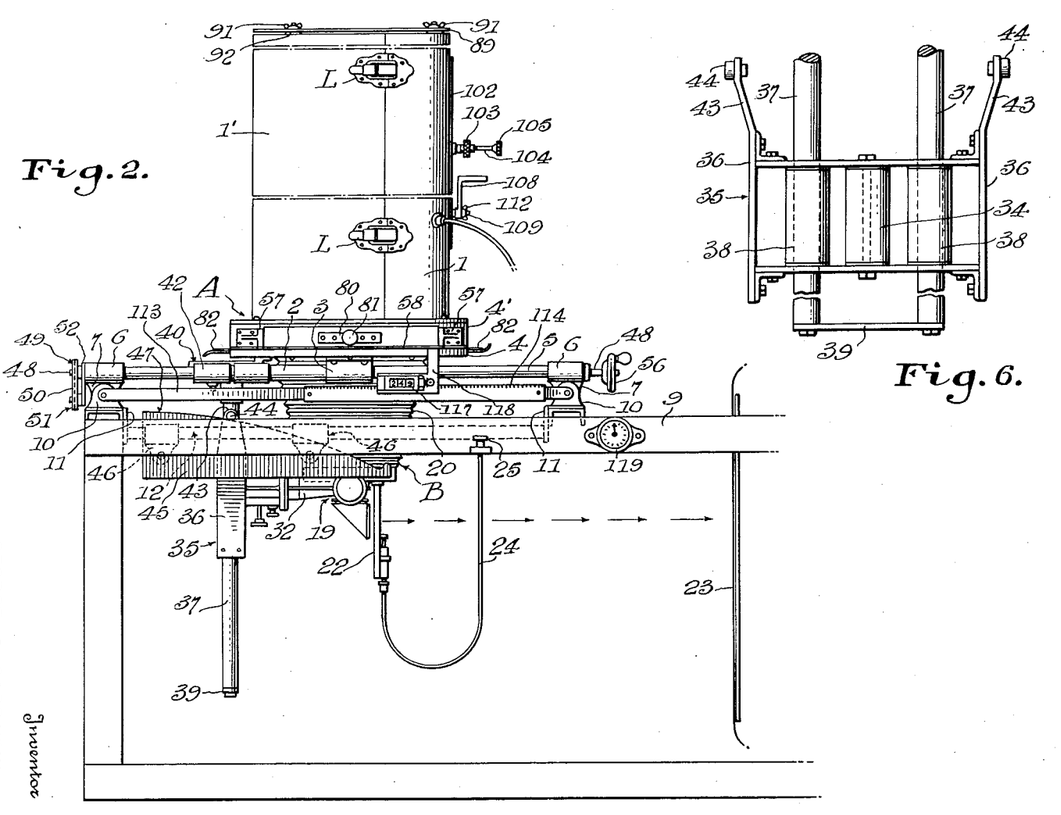
Fig. 2 is a side elevation thereof.
Fig. 6 is an enlarged fragmentary detail view of a portion of an apparatus for actuating an extensible bellows on an enlarging camera of the photographic projector in a vertical direction.
Figure 3:
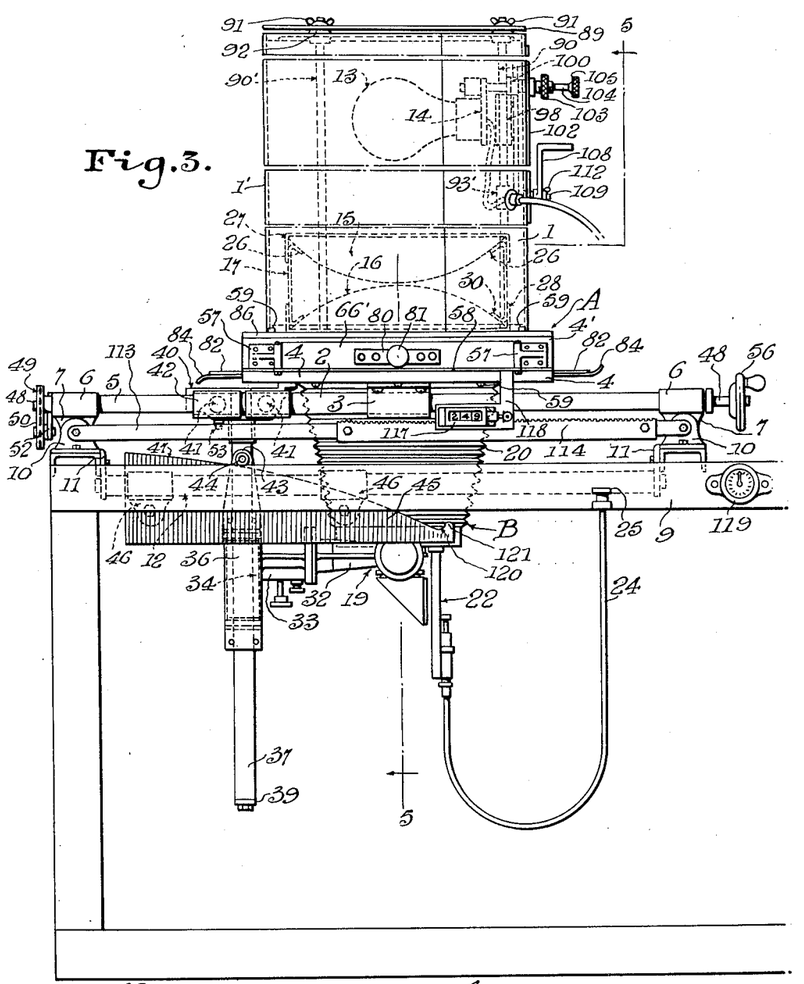
Fig. 3 is an enlarged fragmentary side elevation thereof showing various elements of the invention in dotted outline.

The optical system of the improved photographic projector includes a light source in the form of an electric lamp 13 mounted on an adjustably mounted bracket 14, the usual condensing lenses 15 and 16 arranged in a cylindrical lens holder 17 mounted in the lower end of the lamp housing 1, and an enlarging camera indicated generally by B, including the usual projection enlarging lenses 18 carried on a lens mount 19 at the lower end of the extensible bellows 20. An image projecting prism or mirror 21 is mounted on the lower end of the lens mount 19 for directing the light rays from the lamp 13 in a horizontal direction through a shutter 22 toward a vertically arranged sensitized surface 23 of any suitable material. The image projecting prism or mirror 21 intercepts the main optical axis of the projector, which axis is here shown as vertical, and the mirror is positioned at an angle of forty-five degrees to the optical axis, so that a light beam traveling along the optical axis of the projector and impinging against the reflecting surface of the mirror will be reflected outwardly in a horizontal direction, the angle of incidence being ninety degrees or at a right angle to the main optical axis of the projector. The shutter 22 may be actuated in any suitable manner such as by the flexible shaft 24 which in turn is actuated by the hand knob 25 supported on the frame 9, Figs. 2 and 3.

The upper condensing lens 15 of the optical system is arranged to rest on an inturned upper edge 26 of the lens holder 17, being held in place thereon by a flanged ring 27, and the lower condensing lens 16 is arranged to rest on a flanged ring 28 resting on an inwardly extending shoulder 29 formed on the upper inner surface of the body portion 4' of the negative carrier A adjacent to a central opening 29' formed in the upper end of the body portion 4', with an inturned lower edge 30 of the lens holder resting on the upper outer edge of the lens 16. The extensible bellows 20 of the enlarging camera B depends vertically downward from the horizontally extending negative carrier A centrally between the pairs of supporting members 5 and 5' and 12 and 12', with its upper end suitably secured to the bottom of the base 4 of the negative carrier around an opening 31 formed in the base 4 and with the lens mount 19 on the lower end of the bellows 20 being suitably connected to the inner end of a horizontally extending bracket 32. The outer end 33 of the bracket 32 is mounted at 34 on a substantially rectangular shaped frame 35, Figs. 4 and 6, including side members 36, which frame 35 is in turn slidably mounted vertically on a pair of parallelly arranged vertically extending guide rods 37 by means of bearings 38. The lower ends of guide rods 37 are held in their proper spaced relation by a tie rod 39, and the upper ends of the rods 37 are suitably secured to a bracket 40 which is mounted at its inner end on the lower surface at one edge of the base 4 of the negative carrier A. The bracket 40 extends horizontally outward from one side of the base 4 and is mounted on a pair of transversely extending supporting members 41 having collars 42 on their outer ends fixedly mounted on the members 2 and 2' which are slidably mounted on the tubular members 5 and 5'. The side members 36 of the frame 35 have end portions 43 extending upwardly on opposite ends of the frame, said end portions 43 having rollers 44 mounted on the outer ends thereof, which rollers 44 are adapted to ride on the upper edge of a pair of cam members 45 suitably mounted on the supporting bars 12 and 12' by brackets 46. The cam members 45 are in the form of plates curved on their upper edges 47 in such a manner as to cause the rollers 44 riding thereon to move the extensible bellows 20 of the enlarging camera B upwardly in a vertical direction upon the operation of the photographic projector in a forward direction and to cause the extensible bellows to be extended vertically downward upon the operation of the photographic projector in a rearward direction for a purpose to be hereinafter described.

Figure 7:
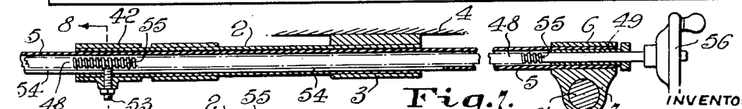
Fig. 7 is a fragmentary longitudinal sectional view through a portion of a mechanism used in actuating the photographic projector in a longitudinal direction.
Figure 8:
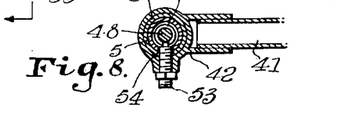
Fig. 8 is a fragmentary transverse sectional view taken on the line 8—8 of Fig. 7.

The photographic projector is actuated either in a forward or rearward direction on the longitudinally extending supporting members 5 and 5' relative to the sensitized surface 23 (Fig. 2) by means of threaded shafts 48 and 48' which are rotatably mounted in bearings 49 mounted in the longitudinally extending tubular members 5 and 5', respectively, Fig. 7. The threaded shafts 48 and 48' extend the entire length and slightly beyond the front ends of the tubular members 5 and 5' and have sprocket wheels 49 fixedly mounted on their front ends, which sprocket wheels 49 carry a sprocket chain 50. The sprocket chain 50 also engages an idler sprocket wheel 51 rotatably mounted on a bracket 52 suitably mounted on the end member 8 intermediate its ends. Screws 53 engage the threaded shaft 48 and 48', which screws 53 are threadedly mounted in the collars 42 on the ends of the supporting members 41 and the tubular members 2 and 2'. The screws 53 also extend through longitudinally extending slots 54 formed in the tubular members 5 and 5', with the inner ends of the screws engaging between the threads 55 of the threaded shafts 48 and 48' (Figs. 7 and 8). A hand-wheel 56 is mounted on the inner end of the threaded shaft 48 for rotation thereof, the purpose of which will hereinafter be described.

Figure 4:
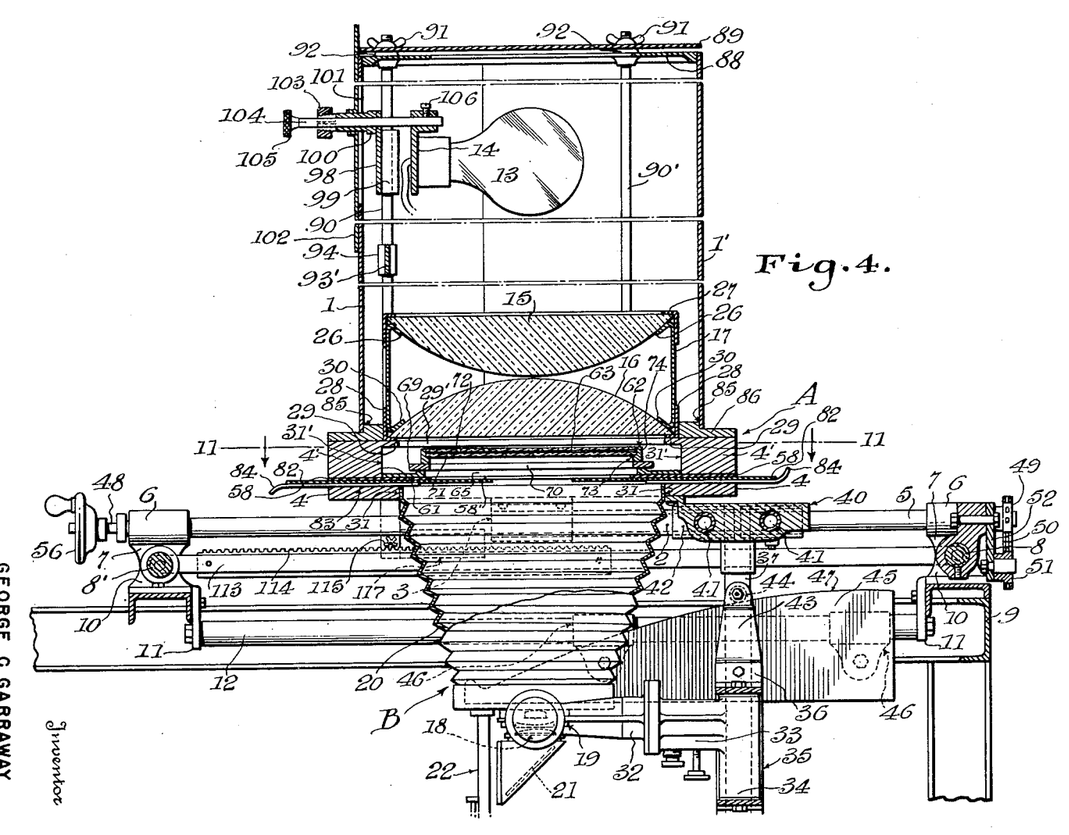
Fig. 4 is a longitudinal sectional view partly in elevation taken on the line 4—4 of Fig. 1.
Figure 11:
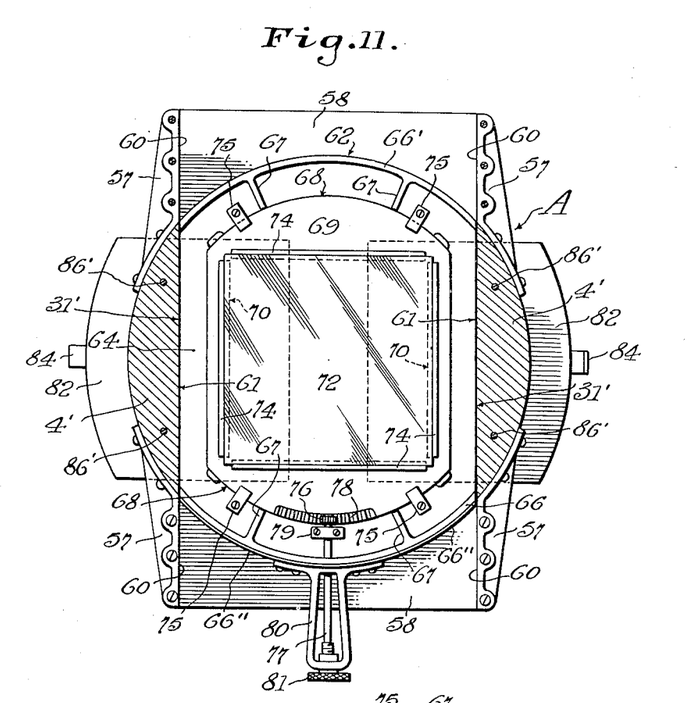
Fig. 11 is a horizontal sectional view taken on line 11—11 of Fig. 4 and illustrating an improved negative carrier which may be used in carrying out the invention.
Figure 12:
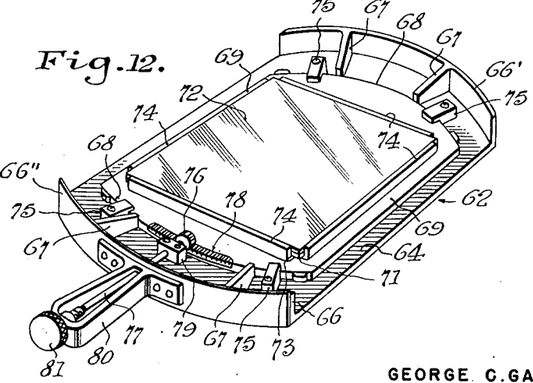
Fig. 12 is a detail perspective view thereof.

The negative carrier A may be of any suitable type but preferably comprises the body portion 4' containing a central opening or guideway 31' and including the base 4 containing the opening 31, Figs. 4 and 11. Vertically extending brackets 57 are mounted at their inner ends on the body portion 4' of the negative carrier A and carry a plate 58 containing an aperture 58', which plate 58 is mounted on the base 4 by screws 59. The inner surfaces 60 of the brackets 57 are in alinement with the side walls 61 of the body portion 4', Fig. 11, forming the guideway 31' for a removable negative holder 62 carrying a negative 63. The negative holder 62, Figs. 4 and 5, comprises a bottom plate 64 having a central opening or aperture 65 therein, and arcuate shaped end walls 66 and 66', Figs. 11 and 12, with inwardly extending spaced ribs 67 formed thereon, the inner ends of which abut against arcuate shaped ends 68 of a movable plate 69. The movable plate 69 has a central opening or aperture 70 therein and is mounted to be slidably moved in a limited arc on the bottom plate 64. The photographic negative or film 63 is sandwiched between transparent member or glass plate 71 and an upper transparent member or glass plate 72, which plates 71 and 72 are adapted to removably seat on shoulders 73 formed on the supporting members 74 which are mounted on the movable plate 69 around the central opening 70 thereof. The plate 69 is actuated in a limited arc in guide elements 75 mounted on the bottom plate 64 by means of a pinion 76 on the inner end of a shaft 77, which pinion 76 meshes with a rack 78 provided on the forward end of the plate 69 intermediate the side edges thereof. The shaft 77 extends through the arcuate-shaped end wall 6 on the plate 64 and through an arcuate stop plate 66" mounted on the end wall 66, said shaft 77 being rotatably mounted in a bearing 79 on the plate 64 and also rotatably mounted on a handle 80 suitably mounted on the outer arcuate surface of the stop plate 66". A finger-engaging wheel 81 is provided on the outer end of the shaft 77, adjacent to the outer end of the handle 80, and is adapted to be actuated for rotating the shaft 77 to actuate the plate 69 in the limited arc. The stop plate 66" is greater in width than the end wall 66 of the bottom plate 64 whereby the upper end thereof is adapted to abut against the body portion 4', Figs. 5 and 12.

In order to vary the effective area of the aperture 58' in the plate 58 of the negative carrier, a pair of adjustable blades 82 is slidably mounted in slots 83 formed in the base plate 4 on opposite sides thereof. The blades 82 are opaque, preferably being fashioned as stampings from sheet metal, and are adapted to be moved in the slots 83 in opposed relation to each other. The outer ends of the blades 82 are provided with members 84 which are bent on their outer ends forming convenient finger grips for manipulating the blades back and forth within the slots 83 by the hand. By adjusting the size of the aperture 58' beneath the negative or film 63, it can be made to fit exactly a negative or film of any desired size up to the full dimension thereof, and alternately desired portions of a negative can be masked off or "cropped."

The lamp housing 1 is of sheet metal construction, being preferably cylindrical in shape, as illustrated, and including a hingedly connected door section 1' held in a closed position by latches L. The lower end of the housing 1 is seated on a shoulder 85 formed around a flange ring 86, which in turn is mounted on the upper surface of the body portion 4' of the negative carrier by screws 86'. The lens holder 17 is smaller in diameter than the lamp housing 1 whereby an air space is provided therebetween for cooling purposes, and the lamp housing 1 itself is cooled by a suitably driven air blower 87. The upper end of the lamp housing 1 has a ring 88 suitably secured thereto and a lid 89 is removably mounted on the ring 88 by means of rods 90 and 90' which are mounted at their lower ends in the upper surface of the flange ring 86 and extend vertically upward through the ring 88 and the lid 89 of the lamp housing. The upper free ends of the rods 90 and 90' have wing nuts 91, threadedly mounted thereon, whereby on tightening up of the nuts the lamp housing 1 is forced downwardly against the shoulder 85 on the flanged ring 86 to provide a light-proof connection therebetween. Washers 92 are provided on the rods 90 and 90' and interposed between the ring 88 and the lid 89 on the top of the lamp housing to provide an air space for permitting the heated air within the lamp housing 1 to escape.

Figures 5, 9, 10:
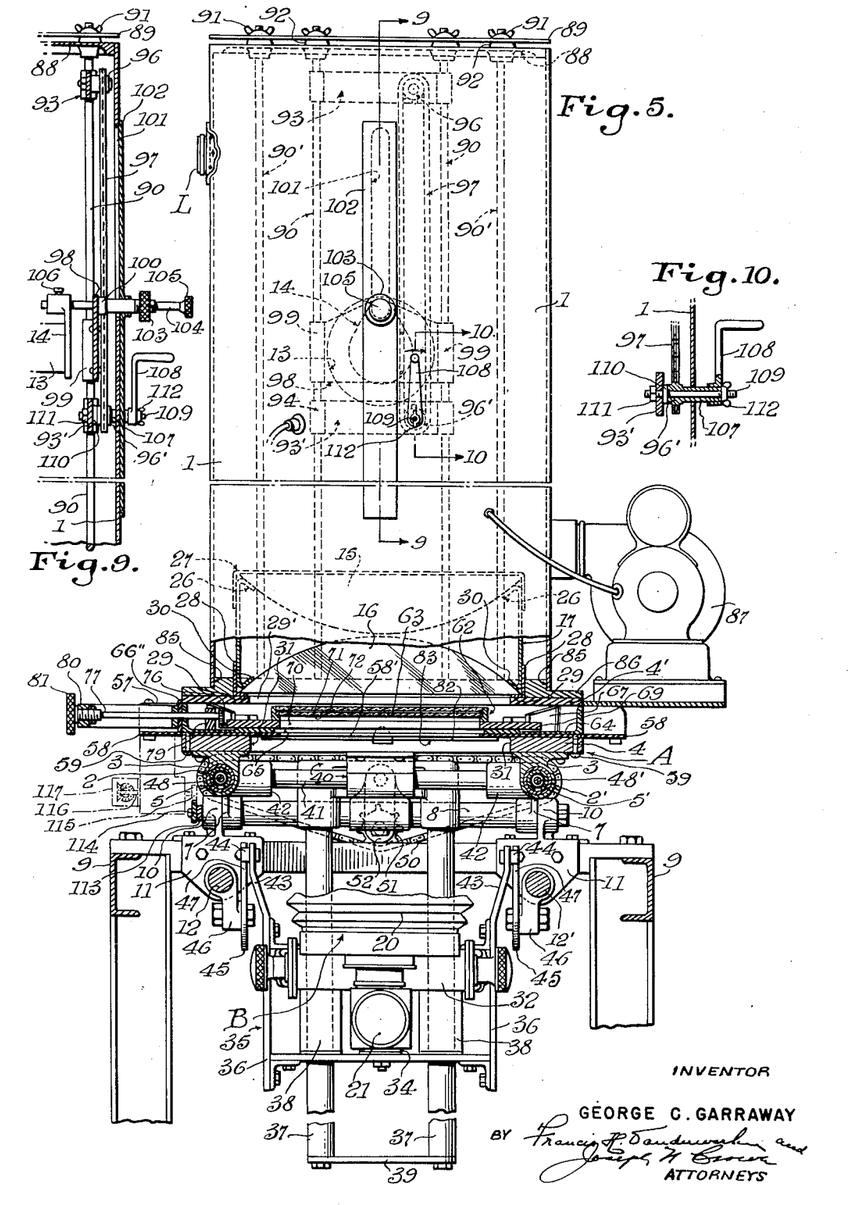
Fig. 5 is an enlarged fragmentary vertical sectional view partly in elevation taken on the line 5—5 of Fig. 3.
Fig. 9 is a fragmentary sectional view of a portion of a lamp housing having an adjusting mechanism for a light source mounted thereon taken on the line 9—9 of Fig. 5.
Fig. 10 is a fragmentary sectional detail view partly in elevation of a part of the light source adjusting mechanism mounted on the lamp housing taken on the line 10—10 of Fig. 5.

The rods 90 are arranged closer together than the rods 90' and have a horizontally extending cross brace 93 fixedly mounted thereon within the housing 1 adjacent the upper ends of the rods 90, and a cross brace 93' is fixedly mounted on the rods 90 at 94, Figs. 5 and 9, below the cross brace 93. The cross braces 93 and 93' have vertically aligned sprocket wheels 96 and 96', respectively, mounted thereon adjacent one end thereof, which sprocket wheels 96 and 96' are connected together by a sprocket chain 97, which has one end of a carrier member 98 secured to a portion thereof, Figs. 5 and 10. The carrier member 98 has bearings 99 on its ends which slidably engage the vertically extending rods 90 and is provided with a bearing 100 suitably secured at its inner end to the upper end of the carrier member, said bearing 100 extending horizontally outward through a vertically extending slot 101 formed in the side wall of the lamp housing 1 and through a slot closing slide 102 to the outside of the lamp housing. The bearing 100 has a tapered threaded outer end which is split for receiving a nut 103, and a shaft 104 is slidably mounted in the bearing 100, which shaft 104 extends into the lamp housing. A finger-engaging wheel 105 is provided on the outer end of the shaft 104 for a purpose which will hereinafter appear.

The lamp bracket 14 carrying the lamp 13 is fixedly mounted on the inner end of the shaft 104 by a screw 106 and the sprocket wheel 96' has a hub 107 thereon which extends through the lamp housing 1, and a crank 108 is mounted on its free outer end. The hub 107 of the sprocket 96' is rotatably mounted on a shaft 109 the inner end of which is fixedly mounted on the bracket 93' by means of a shoulder 110 formed on the shaft 109 and by a nut 111. The shaft 109 extends through the hub 107 beyond the outer end thereof and is threaded on its outer free end for receiving a wing nut 112, whereby upon the tightening up of the nut 112 the sprocket 96' may be adjustably clamped in a non-movable position when desired to hold the lamp 13 in an adjusted position.

A supporting bar 113 extends longitudinally on one side of the photographic projector and is connected at its ends to certain of the brackets 10. A longitudinally extending rack 114 is suitably mounted on the bar 113 and is adapted to be engaged by a pinion 115 mounted on the outer end of a shaft 116 of a counter 117 which in turn is mounted on a bracket 118 carried by the base 4 of the negative carrier A whereby the correct ratio of enlargement of the negative or film 63 may be determined.

In operation of the improved photographic projector enlarger, the negative holder 62 is removed from the carrier A by grasping the handle 80 and pulling outwardly. After the negative holder 62 is removed, the glass plates 71 and 72 are separated and the negative or film 63 is then laid across one of the plates such as the negative plate 71 and the plate 72 is placed over the negative or film 63, whereby the negative or film will be sandwiched between the plates. The negative holder 62 is then inserted into the guideway or opening 31' in the body portion 4' of the negative carrier A until the forward upper edge of the stop plate 66" contacts with the body portion 4', Fig. 5. The light source 13 is then turned on whereby the beam of light therefrom passes through the condensing lenses 15 and 16, the opening 29' in the upper end of the body portion 4' of the negative carrier, thence through the negative glass plate 72, negative 63, glass plate 71, through the central opening 65 in the bottom plate 64 of the negative holder 62, through the aperture 58' in the plate 58, and then enters the upper end of the extensible bellows 20 of the enlarging camera B. The light beam with an image of the negative or film 63 then passes through the enlarging lenses 18 on the lens mount 19 at the lower end of extensible bellows 20 and impinges against the reflecting surface of the projecting mirror 21 whereby the light beam is reflected in a horizontal direction toward the shutter 22. Upon actuating the knob 25 on the free end of flexible shaft 24 by the hand, the flexible shaft may be moved to cause the shutter 22, which is normally closed, to be opened, thus permitting the light beam to pass therethrough and to impress an image of the negative or film 63 onto the sensitized surface 23.

Having inserted the negative holder 62 in the projector, the projector is focused onto the sensitized surface 23 by turning hand-wheel 56 on the inner end of the shaft 48. When the hand-wheel 56 is rotated in a counter-clockwise direction, the shafts 48 and 48' are rotated through the instrumentality of the sprocket wheels 49 on the outer ends thereof and the sprocket chain 50, thereby causing the projector to move in a forward longitudinal direction away from the sensitized surface 23 by means of the screws 53 mounted on the short tubular members 2 and 2' on which the projector is fixedly mounted, engaging with the threads 55 on the shafts 48 and 48'. Upon the movement of the projector in a forward horizontal direction, the rollers 44 on the upper ends of the frame 36 are caused to ride up on the upper edges 47 of the cam members 45 thereby carrying the frame 36 upwardly in a vertical direction with it, and collapsing the extensible bellows 20 in an upward vertical direction by means of the bracket 33 connecting the lower end of the extensible bellows with the frame 36. The cam edges 47 on the members 45 are curved in a predetermined manner so that at each horizontal position of the rollers 43 thereon, the distance between the projection lenses 18 on the lower end of the camera A and the negative or film 63 in the holder 62 is in correct relation to the distance between the projection enlarging lenses 18 and the sensitized surface 23.

The distances are governed by the following formula:

$$D = fM + f$$

$$d = \frac{D}{M} \text{ or } \left(\frac{f}{M}\right) + f$$

wherein—

$M$ = Ratio or degrees of magnification
$f$ = Focal length of projection lens
$D$ = Distance between projection lens and exposure surface
$d$ = Distance between projection lens and negative For each ratio of enlargement, the distance between the projection lenses 18 and the negative 63 must be corrected. This is accomplished by the movement of the projection lenses on the extensible bellows 20 in a vertical upward or downward direction upon the projector being moved horizontally.

In order to obtain the desired enlargement of the negative or film 63 on the sensitized surface 23, the ratio of enlargement is determined by means of the counter 117 which is mounted on the projector and connected to the rack 114 by means of the pinion 115. As the projector is moved horizontally in a forward direction, the pinion 115 rides in the rack 114 thereby causing the counter 117 to be operated. The ratio of the pinion 115 and rack 114 is so designed that the numerals on the counter register movement of the projector equal to the focal length of the projection lens 18 divided by 100 or f/100.

The projector and counter are so installed that when $D = f1 + f$ or $M = 1:1$ the counter registers 100 then at any position of the projector the numerals on the counter will register ratio of enlargement.

In the present case the counter is indicated as registering 249 showing that the distance D or distance between the projection lenses 18 and the sensitized surface 23 is correct for an enlargement in the ratio of 2.49 to 1.

Theoretically the light source 13 is a point of light. When the light source is centered on a line through the center of the projection lenses 18 and the condensing lenses 15 and 16 and when the distance from the condensing lens 15 to the light source 13 is adjusted in the correct relation to the distance between the condensing lens 15 and the projection lenses 18, the rays from the light source are brought to a focus as a point of light in the center of the projection lens. The light rays from the light source 13 are projected by the projection lens 18 to the sensitized surface 23 in the form of a uniform circle of light.

As the negative 63 is interposed between the condensing lenses 15 and 16 and the projection lenses 18, the light reaching the sensitized surface 23 is varied directly in proportion to the density of the negative image. Now if the light source 13 is moved away from the line through the center of the lenses, chromatic aberration causes a blue "ghost" or darker area to appear in the light circle at the edge of the circle opposite the radius on which the light has been moved. If the light is brought closer to the condenser lens 15, this dark area will appear as a fringe around the edge of the light circle, the dark area increasing and the comparatively lighter central area diminishing in size as the light is brought further out of focus toward the condensing lens 15.

By moving the light source 13 vertically and by adjusting the light horizontally in any direction, the intensity of the light reaching the sensitized surface 23 may be adjusted to correct a negative of uneven density.

The lamp 13 may be adjusted in an upward or downward vertical direction within the lamp housing 1 by turning the crank 108 by hand either in a clockwise or counter-clockwise direction, respectively. By turning the crank 108 in a clockwise direction as indicated by the arrow, the sprocket 96 is rotated in the same direction whereby the sprocket chain 97 is rotated around on the sprocket wheel 96' causing the portion of the chain to which the carrier member 98 is connected to move upwardly, carrying the member 98 with it, together with the lamp 13 and its connected parts, upwardly in a vertical direction away from the condensing lens 15, with the bearings 99 of the member 96 sliding upwardly on the rods 90, and by actuating the crank 108 in a reverse or counter-clockwise direction the lamp 13 and its connected parts are caused to be moved downward toward the condensing lens 15, whereby the intensity of the light beam from the lamp 13 reaching the sensitized surface 23 may be adjusted to correct a negative of uneven density. The lamp 13 may be adjusted horizontally by unscrewing the nut 103 outwardly on the tapered, split outer end of the bearing 100, whereby the shaft 104 may be moved horizontally inwardly or outwardly in the bearing by the finger-engaging wheel 105, thus moving the lamp 13 on the inner end of the shaft 104 either inwardly or outwardly, whereby the intensity of the light beam reaching the sensitized surface 23 may be adjusted to correct a negative of uneven density. By turning the wheel 105 with the hand in one direction, the shaft 104 may be rotated whereby the lamp 13 may be moved away from the line through the center of the lenses if desired, whereby chromatic aberrations cause a blue (ghost) or darker area to appear in the light circle at the edge of the circle opposite the radius on which the lamp has been moved, and by turning the wheel 105 in another direction the shaft 104 may be rotated to move the lamp 13 closer to the condensing lens 15 whereby a fringe will appear around the edge of the circle of light, with the dark area increasing and the comparatively brighter central area diminishing in size as the lamp is brought further out of focus toward the condensing lens 15. After the lamp 13 has been properly adjusted, the nut 113 is tightened up on the tapered outer end of the bearing 100, thus holding the shaft 104 in a non-movable position.

After properly focusing the projector, the operator grasps the ends of the members 84 on the masking blades 82 and either adjusts them to border the particular size of the negative being used or mask off part of it as desired. For a change in angular position of the negative 63, the operator only has to turn the wheel 81 with the fingers to rotate the shaft 77 whereby the pinion 76 on the inner end of the shaft engages with the rack 78, rotating the bottom plate 69 as previously described without removing the negative or film 63 from its holder. The time of exposure of the negative or film 63 on the sensitized surface 23 through the shutter 22 may be timed by any suitable means such as by the clock 119 after which the shutter 22 may be closed by actuating the flexible shaft 24 by means of the hand knob 25.

By rotating the hand wheel 56 in a clockwise direction, the shafts 48 and 48' are rotated in the same direction through the sprocket wheels 49 and chain 50, thereby causing the projector to move rearwardly in a longitudinal direction by means of the screws 53 engaging with the threads 55 on the shafts 48 and 48'. Upon the movement of the projector in a rearward direction, the rollers 44 on the upper ends of the frame 36 are caused to ride down on the upper edges 47 of the cam members 45, thereby causing the frame 36 to move downwardly in a vertical direction and permitting the extensible bellows 20 to be extended downwardly until the rollers 44 engage in seats 120 against stops 121 formed on the lower inner ends of the cam members 45. The manipulation of the projector can be carried out in such a simple and convenient manner that the operator may devote all of his attention to his work rather than be disturbed by numerous mechanical details.

It will thus be seen that a novel and efficient form of photographic projector enlarger is provided which is well adapted for all of the purposes indicated. Even though there has been herein described and shown certain features of construction and operation of parts, it is nevertheless to be understood that various changes may be made therein if the changes do not depart from the spirit or scope of the claims.

Having described my invention, what I claim as new and wish to secure by Letters Patent is:

1. In a device of the character described, the combination of a support and a photographic projector including a lamp housing, and an enlarging camera movably mounted on the support, said enlarging camera including an extensible bellows, a light source mounted in the lamp housing, a negative carrier adapted to support a negative beneath the light source, said enlarging camera alined with the optical axis of the photographic projector and adapted to project an enlarged image of the negative onto a sensitized surface, means for moving the photographic projector on the support relative to the surface for producing any desired ratio of enlargement of the negative image on the surface, vertically extending guide rods mounted on said negative carrier, a frame including spaced horizontally extending members, vertically extending side members and bearings extending beween said horizontally extending members and movably mounted on said guide rods, a rigid member mounted on said horizontally extending members of said frame and between said bearings, said rigid member secured to one end of said extensible bellows, cams mounted on said support, rollers mounted on said side members of the frame, said rollers engaging said cams and adapted to ride thereon, whereby said frame is actuated on said guide rods to move said rigid member for actuating said extensible bellows to focus automatically the enlarging camera for any movement of the photographic projector on the support relative to the sensitized surface.

2. In a device of the character described, the combination of a support and a photographic projector including a lamp housing, and an enlarging camera including an extensible bellows movably mounted on the support, condensing lenses and a light source mounted in the lamp housing, means including a carrier adapted to removably support a negative beneath the condensing lenses, whereby the negative is exposed to a light beam from the light source, said enlarging camera alined with the optical axis of the photographic projector and adapted to project an enlarged image of the negative onto a sensitized surface, means for moving the photographic projector on the support relative to the surface for producing any desired ratio of enlargement of the negative image on the surface, spaced vertically extending guide rods mounted on said first-mentioned means, a vertically disposed frame including upper and lower horizontally extending members, vertically extending side members and bearings positioned between said horizontally extending members, said bearings movably mounted on said guide rods, a rigid member mounted on said horizontally extending members of said frame and between said bearings, rollers mounted on said side members of said frame, cams mounted on said support, said rollers engaging said cams and adapted to ride thereon whereby said frame is actuated on said guide rods to move said rigid member for actuating said extensible bellows to focus automatically the enlarging camera for any movement of the photographic projector on the support relative to the surface, and mean including a rack mounted on said support, a counter mounted on said photographic projector and a pinion mounted on said counter, said pinion engaging said rack for actuating said counter to indicate the amount of movement of the photographic projector on the support to produce the desired ratio of enlargement of the negative image on the sensitized surface.

3. In a device of the character described, the combination of a support and a photographic projector including a lamp housing, and an enlarging camera mounted to move longitudinally on said support relative to a surface, a negative carrier, said lamp housing mounted on the carrier and said enlarging camera including an extensible bellows extending vertically downward from the negative carrier, a lens holder on the lower end of the extensible bellows, projection lenses and a reflecting surface mounted on the lens support, said reflecting surface positioned on the lens holder at an angle of 45° to the projection lenses, condensing lenses and a light source provided in the lamp housing, said light source mounted in the housing above the condensing lenses and said negative carrier adapted to support a negative beneath the condensing lenses whereby the negative is exposed to a light beam from the light source through the condensing lenses, said projection lenses on the lens support alined with the optical axis of the photographic projector and adapted to project an image of the negative onto the reflecting surface, and said reflecting surface adapted to project a negative image horizontally outward from the photographic projector onto a sensitized surface, means for moving the photographic negative horizontally on the support relative to the surface for producing any desired ratio of enlargement of the negative image on the sensitized surface, vertically extending guide rods mounted on said negative carrier, a frame including spaced longitudinally extending members, vertically extending side members and bearings positioned between said longitudinally extending members, said bearings movably mounted on said guide rods, a rigid member mounted on said longitudinally extending members of said frame and between said bearings, said rigid member secured to said lens holder, cams mounted on said support, rollers mounted on said side members of said frame, said rollers adapted to engage said cams and to ride thereon, whereby said frame is moved on said guide rods to move said rigid member to automatically actuate the extensible bellows in a vertical direction for automatically focusing the camera for any horizontal movement of the photographic projector on the support relative to the sensitized surface.

4. In a device of the character described, the combination of a support including longitudinally extending members, tubular members movably mounted on said longitudinally extending members, and a photographic projector movably mounted on the support, said projector including a horizontally extending negative carrier containing an exposure aperture therein and fixedly mounted on the tubular members, a lamp housing mounted on the negative carrier, condensing lenses and a light source provided in the lamp housing, said light source adjustably mounted on the housing above the condensing lenses, said exposure aperture in the carrier in optical alinement with the optical axis of the projector, a negative holder removably mounted in the carrier and including exposure apertures in alinement with the exposure aperture of the carrier, said holder adapted to movably support a negative above the exposure apertures thereof and beneath the condensing lenses, an enlarging camera including an extensible bellows extending downwardly from the negative carrier with an upper end of the extensible bellows engaging the negative carrier around the exposure aperture therein, a lens mount secured to the lower end of said extensible bellows, projection lenses and a reflecting mirror positioned at an angle of 45° to the projection lenses mounted on said lens mount, said enlarging camera alined with the optical axis of the photographic projector and adapted to project an enlarged image of the negative in a horizontal direction onto a sensitized surface, means including a sprocket chain and wheels for actuating the tubular members on the longitudinally extending members of the support for moving the photographic projector longitudinally of the support relative to the sensitized surface for producing any desired ratio of enlargement of the negative image on the sensitized surface, vertically extending guide rods mounted on said negative carrier, a frame including vertically extending side members, horizontally extending members and bearings extending between said horizontally extending sections, said bearings movably mounted on said guide rods, a rigid member mounted on said longitudinally extending members of said frame and between said bearings, said rigid member secured to said lens mount, cams mounted on said support, rollers mounted on said vertically extending members of said frame, said rollers adapted to engage said cams and to ride thereon, whereby said frame is actuated on said guide rods to move said rigid member to automatically actuate the extensible bellows in a vertical direction for automatically focusing the enlarging camera for any horizontal movement of the photographic projector on the support relative to the sensitized surface, and means including a counter and rack for indicating the amount of movement of the photographic projector on the support to produce the desired ratio of enlargement of the negative image on the surface.

5. In a device of the character described, the combination of a supporting structure including upper longitudinally extending supporting members, transversely extending supporting members joining said longitudinally extending supporting members together, spaced longitudinally extending tubular members fixedly mounted on said transversely extending supporting members, longitudinally extending slots formed in one end of each of said tubular members, short tubular sections movably mounted on said tubular members, a photographic projector fixedly mounted on said short tubular sections, said photographic projector including a horizontally extending negative carrier mounted on said short tubular sections and having an exposure aperture therein, a lamp housing mounted on said negative carrier, a light source and condensing lenses mounted in said lamp housing, said light source mounted in said housing above said condensing lenses and said negative carrier adapted to support a negative beneath said condensing lenses, an enlarging camera including an extensible bellows having upper and lower end portions, said upper end portion of said extensible bellows secured to the negative carrier around the exposure aperture therein, with said extensible bellows extending vertically downward from said negative carrier between said tubular members, a lens holder mounted on the lower end portion of said extensible bellows, projection lenses and a reflecting surface mounted on said lens holder, said reflecting surface positioned at an angle of 45° to the projection lenses and adapted to project an image of said negative onto a strip of sensitized material, said strip of sensitized material vertically supported beneath said tubular members, means for actuating the short tubular sections on said tubular members for moving the photographic projector longitudinally on said tubular members relative to the sensitized material for producing any desired ratio of enlargement of the negative image on the sensitized material, said means including threaded shafts mounted in said tubular members, certain ends of said shafts extending from said tubular members, screws mounted on one end of each of said short tubular sections, said screws extending through said slots in said tubular members and engaging in the threads of said shafts, manually actuated means provided on one of said threaded shafts, a sprocket wheel mounted on one end of each of said threaded shafts, a sprocket chain mounted on said wheels, whereby upon the operation of said manually actuated means the threaded shafts have identical movement and causing said screws to ride in the threads of said shafts for moving the tubular extensions and actuating said photographic projector longitudinally in said tubular members relative to the sensitized material, and means to focus automatically the enlarging camera for any movement of the photographic projector on the tubular members relative to the sensitized surface.

6. In a device of the character described, the combination of a supporting structure including upper longitudinally extending supporting members, transversely extending supporting members joining said longitudinally extending members together, spaced longitudinally extending tubular members fixedly mounted on said transversely extending supporting members, longitudinally extending slots formed in one end of each of said tubular members, short tubular sections movably mounted on said tubular members, a photographic projector including a horizontally extending negative carrier fixedly mounted on said short tubular sections and having an exposure aperture therein, a lamp housing mounted on said negative carrier, a light source and condensing lenses mounted in said housing, said lenses mounted in said housing above said condensing lenses and said negative carrier adapted to support a negative beneath said condensing lenses, an enlarging camera including an extensible bellows having upper and lower end portions, said upper end portion of said extensible bellows secured to the negative carrier around said exposure aperture and said extensible bellows extending vertically downward from said negative carrier between said tubular members, a lens holder mounted on the lower end portion of said extensible bellows, projection lenses and a reflecting surface mounted on said lens holder, said reflecting surface arranged at an angle of 45° to the projection lenses and adapted to project an image of said negative onto a strip of sensitized material said strip of sensitized material vertically supported beneath said tubular members, means for actuating the short tubular sections on said tubular members for moving the photographic projector longitudinally on said tubular members relative to the sensitized material, said means including threaded shafts mounted in said tubular members, certain ends of said shafts extending from said tubular members, screws mounted on one end of each of said short tubular sections, said screws extending through said slots in said tubular members and engaging in the threads of said shafts, manually actuated means provided on one of said threaded shafts, a sprocket wheel mounted on one end of each of said shafts, a sprocket chain mounted on said wheels, whereby upon the operation of said manually actuated means the threaded shafts have identical movement and causing said screws to ride in the threads of said shafts for moving the tubular sections and actuating said photographic projector longitudinally on said tubular members relative to the sensitized material, vertically extending guide rods mounted on said negative carrier, a frame including spaced horizontally extending members, vertically extending side members and bearings extending between said horizontally extending members, said bearings movably mounted on said guide rods, a rigid member mounted on said horizontally extending members of said frame and between said bearings, said rigid member secured to said lens holder on the lower end of said extensible bellows, cams mounted on said supporting structure, rollers mounted on said side members of said frame, said rollers engaging said cams and adapted to ride thereon, whereby said frame is actuated on said guide rods to move said rigid member for actuating said extensible bellows to focus automatically the enlarging camera for any movement of the photographic projector on the tubular members relative to the sensitized material.

GEORGE C. GARRAWAY.